United States Patent [19]

Meier

[11] Patent Number: 5,262,053
[45] Date of Patent: Nov. 16, 1993

[54] FILTRATION PROCESS, USE OF STABILIZERS INSTALLATION FOR A FILTRATION PROCESS, AND PROCEDURE FOR OPERATING SAID INSTALLATION

[75] Inventor: Josef Meier, Engelburg, Switzerland

[73] Assignee: Filtrox-Werk AG, St. Gallen, Switzerland

[21] Appl. No.: 732,734

[22] Filed: Jul. 18, 1991

Related U.S. Application Data

[63] Continuation of Ser. No. 379,063, Jul. 13, 1989, abandoned.

[30] Foreign Application Priority Data

Jul. 15, 1988 [CH] Switzerland ............................ 2717/88
Jul. 15, 1988 [CH] Switzerland ............................ 2725/88

[51] Int. Cl.⁵ ............................................. B01D 61/16
[52] U.S. Cl. ..................................... 210/636; 210/651; 210/653; 210/639
[58] Field of Search ............... 210/639, 651, 653, 636, 210/638, 193, 777; 426/442, 423

[56] References Cited

U.S. PATENT DOCUMENTS

| | | | |
|---|---|---|---|
| 3,733,265 | 5/1973 | Kraus et al. | 210/23 |
| 3,835,040 | 9/1974 | Mahlman et al. | 210/653 |
| 3,977,967 | 8/1976 | Trulson et al. | 210/638 |
| 3,996,131 | 12/1976 | Cohn | 210/651 X |
| 4,089,778 | 5/1978 | Gauger | 210/639 X |
| 4,579,662 | 4/1986 | Jonsson | 210/636 |
| 4,610,792 | 9/1986 | Van Gils et al. | 210/639 |
| 4,634,531 | 1/1987 | Nakagawa et al. | 210/639 |
| 4,749,487 | 6/1988 | Lefebvre | 210/500.25 X |
| 4,764,588 | 8/1988 | Smith et al. | 426/330.3 X |
| 4,880,650 | 11/1989 | Okamura et al. | 426/442 X |
| 4,943,374 | 7/1990 | Heininger et al. | 210/651 |

FOREIGN PATENT DOCUMENTS

| | | |
|---|---|---|
| 3533306 | 3/1987 | Fed. Rep. of Germany . |
| 2231407 | 5/1974 | France . |
| 86/05511 | 9/1986 | PCT Int'l Appl. . |
| 88/01139 | 2/1988 | PCT Int'l Appl. . |
| 89/00013 | 1/1989 | PCT Int'l Appl. . |
| 1255268 | 12/1971 | United Kingdom ............ 210/639 |
| 2163062 | 7/1985 | United Kingdom . |

OTHER PUBLICATIONS

Brauerei-Rundschau, vol. 90, No. 1/2, Jan./Feb. 1979, pp. 55–59 and 67–75.

*Primary Examiner*—Frank Spear
*Attorney, Agent, or Firm*—Woodcock Washburn Kurtz Mackiewicz & Norris

[57] ABSTRACT

A medium containing tanning agents and/or albumens, such as beer, wine, or fruit juice, is simultaneously stabilized and filtrated by means of cross-flow filtration in the ultrafiltration or microfiltration range, in the presence of a stabilizer.

13 Claims, 5 Drawing Sheets

FILTRATION PROCESS, USE OF STABILIZERS INSTALLATION FOR A FILTRATION PROCESS, AND PROCEDURE FOR OPERATING SAID INSTALLATION

This is a continuation of application Ser. No. 379,063, filed Jul. 13, 1989, now abandoned.

FIELD OF THE INVENTION

The present invention relates to methods and apparatus for filtration and stabilizing of a sludge material as well as of a liquid medium containing tanning agents and/or protein, i.e., of a non filtered medium, particularly of beer, wine, or fruit juice.

BACKGROUND OF THE INVENTION

In known processes for filtration and stabilization of media containing tanning agents and/or protein, e.g. beer, wine, or fruit juice, the medium is first filtered in a diatomite filter (e.g. a layer filter or a multiple tube filter), thereafter stabilized in a stabilizer installation, and finally filtered once more. Such processes are correspondingly costly and require sizable investments in the installations.

Cross-flow filtration processes for microfiltration or ultrafiltration are known and common in the most diverse areas of the technology. In the cross-flow technology, the filtration membranes are not only penetrated from the unfiltered or feed side to the filtrate resp. permeate side, but on the unfiltered side, a strong cross-flow is additionally generated along the membrane surface. The purpose of the cross-flow is to prevent the formation of a certain layer of retained sludge on the side of the unfiltered medium. The transfer pumping of the unfiltered medium serves to remove the build-up of slurry substances from the membrane before the latter is blocked by them. At least, there should be a limitation of the thickness of the layer of separated substances on the membrane surface, so that filtration with a relatively constant flow of permeate should be possible over longer periods of time. However, since the separation of slurry and filtrate takes place immediately at the membrane surface and under the influence of the transmembrane pressure resp. the trans-membrane flow, the accumulation of separated slurry substances cannot be completely prevented, not even in cross-flow filtration. Mostly, a delicate cover layer of separated slurry substances will form relatively rapidly, i.e. immediately as the filtration begins, and that layer may in itself have certain filtration characteristics. Such cover layers are formed at ultrafiltration membranes with a pore dimension of approximately 0.001 to 1 $\mu$, as well as at microfiltration membranes with a pore dimension of approx. 0.1 to 1 $\mu$. Practical experience shows that with a fine-pore surface, i.e. in the case of ultrafiltration as well, the membranes used in the cross-flow process are less susceptible to clogging than is the case with coarse-pore membrane surfaces.

In many known cross-flow filtration processes, there is consequently a periodical backwashing, i.e., during the filtration, the membranes are briefly subjected to pressure from the filtrate side, against the direction of the filtration. This causes a partial loosening or rejection of the layer on the side of the unfiltered medium, or a clearing of the membrane pores. This makes it possible to reduce the flow resistance in the filtration direction to a certain degree.

SUMMARY OF THE INVENTION

The purpose of the invention is to avoid the disadvantages of that which is known, thus, in particular, to create a simplified and more economical process for filtration and stabilization of a liquid medium containing a tanning agent and/or proteins. As far as possible, this should be achieved in one process step and with maintenance of high filtration performance. According to the invention, this is achieved primarily thereby that the unfiltered medium is filtered and stabilized by means of cross-flow membrane filtration in the ultrafiltration or microfiltration range, in the presence of a stabilizer. In this manner, the medium can be both filtered and stabilized in one single process step, especially when the unfiltered medium contains only a small portion of slurry substance, and it is thus possible to achieve significant savings with respect to the filtration installations while at the same time abbreviate and simplify the process. In particular, it has been found that when, during cross-flow membrane filtration, the unfiltered medium is continuously kept in circulation by pumping, the stabilizer is uniformly mixed with the unfiltered medium and remains in contact with the unfiltered medium for the required time period. Thereby, it is advantageous to meter the stabilizer continuously into the unfiltered medium. This can be achieved primarily by metering into a working tank, or, by metering into the cross-flow circulation. It has been found advantageous to pump the stabilizer together with the unfiltered medium in a circulation through the membrane filters of the cross-flow filtration installation. Thereby, the circulation loop may be closed directly from the outlet of the filtration installation to its intake by means of a pump. However, it is also possible to close the circulation loop via the working tank, i.e., the unfiltered medium is continuously pumped from the working tank through the membrane filter, and the residue, with the stabilizer contained therein, which remains at the outlet of the filtration installation is then returned into the working tank. The small size of the pores of such cross-flow membrane filters (0.001–1 $\mu$ for ultrafiltration, approximately 0.1–1 $\mu$ for microfiltration) reliably prevents the infiltration of bound or precipitated tanning agents or proteins into the filtrate. Rather, these are circulated with the residue on the side of the unfiltered medium of the membrane filter until a filtration cycle is completed.

The stabilizer can thereby be metered in as "lost" and can be removed from the filtration installation together with the slurry substances upon completion of a filtration cycle. Polyvinylpolypyrrolidone (PVPP) and silica gel have proven particularly useful when applied according to the invention.

Insofar that the unfiltered material contains high proportions of slurry material, the filtration performance of the membrane filter can be improved if a granular or fibrous filter additive is added to prevent clogging of the membrane pores by such slurry substances.

"Granular" in this context is to be understood as that type of additives which consist of regularly or irregularly shaped particles which neither dissolve in the unfiltered medium nor conglutinate or become otherwise compacted under the influence of the transmembrane pressure. According to the invention, such filter additives consisting of granular particles are deposited along the membrane surface in spite of the cross-flow and can thus prevent the formation of continuous cover layers of slurry substances.

The filter additive can advantageously be applied as a cover layer directly onto the surface of the membrane. This reliably protects the pores on the membrane surface against clogging by slurry substances. Thereby, the cover layer shall have a thickness of between 1 and 20 $\mu$m, preferably between 1 and 8 $\mu$m; thus, it does not constitute a filter layer in the conventional sense but a protective layer for the actual membrane filter layer.

The filter additive can be applied to the membrane surface prior to the beginning of the filtration process. Thereby, a cover layer is created which consists exclusively of the filter additive and is free of admixtures of slurry substances. This can be achieved if, when a filtration cycle is to be started, the membranes are first washed over with a medium that contains no significant proportion of slurry substances, if the filter additive is added to the medium in order to form the cover layer, and if the unfiltered medium is then led into the membrane. Such a cover layer can easily be created thereby that the filtration cycle is started with water, into which the filter additive has been introduced. As soon as the cover layer has been created, the water can be pressed out of the filter as a, and unfiltered medium can be introduced.

Such a filtration cycle can also be started in a particularly efficient manner if the filtration cycle is started with the filtrate from a previous filtration cycle and the filter additive is added to this filtrate. Thus, the cover layer is created by the filtrate proper, which, so to speak, is filtrated once more, thereby building up the cover layer. Thereafter, new unfiltered medium can be added relatively rapidly, so that the filtration cycle can begin quickly and without interruption.

In many application cases, it may be advantageous to add filter additive to the unfiltered medium. Provided that there is no characteristic tendency to rapid formation of cover layers consisting of slurry substances due to such substances existing in the unfiltered material, the filtration cycle can be started in this manner. Thereby, a cover layer of the filter additive will then be formed, in which a certain proportion of slurry substances is embedded. As an alternative, it is also possible to continuously or discontinuously introduce filter additive into the unfiltered medium after a cover layer of filter additive has formed subsequently to the start-up with water or filtrate. The particles of the filter additive disturb any layers of slurry substances, so that these become more permeable. In addition, the granular filter additives prevent the formation of compact layers, so that the cross-flow can more easily dissolve accumulations of slurry substances.

The protection of the membrane pores against clogging is achieved in a particularly reliable manner if one applies a filter additive with a granular size greater than the pore size of the filter membrane. A granular size of between 1 and 80 $\mu$m has been found to be particularly effective, whereby it is possible to optimize the filter additive within this range with respect to the medium to be filtrated, namely by appropriate selection of the distribution of granular size, e.g. 60%–80% of the particles in the range from 1 $\mu$m to 4 $\mu$m.

Particularly good permeability and large filtration surface can be obtained if diatomite is used as filter additive.

The filtrate performance (filtrate quantity per square meter membrane surface) can be improved in certain applications by using perlite. A correspondingly "granular" stabilizer such as e.g. PVPP can also be used as a filter additive of this nature. Two significant, advantageous effects are simultaneously achieved thereby for media containing tanning agents and proteins: Due to the formation of a cover layer consisting of the filter additive or the stabilizer, the filtrate performance is significantly increased, and clogging of the membrane pores is prevented. In addition, the stabilizer effect, which is known per se is utilized, i.e. the tanning agents or albumens contained in the unfiltrated medium are bound by the stabilizer.

Thus, the invention makes it possible to e.g. filtrate and stabilize beer in a cross-flow membrane filter without prefiltration in a conventional diatomite filter (as described e.g. in *Brauerei-Rundschau*, Vol. 90, No. 1/2, Jan./Feb. 1979, pp. 55-59 and 67-75). Due to the simultaneous stabilization, one will achieve significant savings in the construction and operation of filtration and stabilization installations.

Effective cover layers, which have self-defined permeation characteristics and also prevent clogging of the membrane pores can be structured not only out of diatomite by also out of fibrous fiber additives, e.g. cellulose fibers. In addition, aluminum silicate, potato starch, and—depending on the medium—active carbon are also particularly suitable as filter additives for the application according to the invention.

For specific applications, it may also be advantageous to use a mixture of various filter additives. This makes it possible to combine e.g. the advantageous characteristics of diatomite or perlite for increased filtrate performance with the PVPP characteristics of binding tanning agents.

This can be achieved in a particularly advantageous manner if at least two filter additives are introduced in sequence. This can be done e.g. in such a manner that a first cover layer, e.g. of diatomite or perlite, is applied on the membrane surface during the start-up of the filtration cycle with a medium that contains no slurry substances. Thereafter, a second material, e.g. PVPP, can also be introduced prior to the start-up or continuously introduced into the unfiltered medium.

During filtration with a membrane with a pore diameter of no more than 0.5 $\mu$m and preferably of approximately 0.2 $\mu$m it is possible to obtain particularly good results in a practical application, if the unfiltered medium flows over the membrane surface at a rate of approximately 3—6 meters per second. On one hand, this flow rate still allows the formation of sufficient cover layers of filter additive and/or stabilizer. On the other hand, the cross-flow at the surface of the cover layer of filter additive is sufficiently strong to generate turbulence and dissolve deposits of slurry substances by means of e.g. individual particles of the filter additive or the stabilizer, thus maintaining the permeability of the cover layer.

During microfiltration, reliable cover layers of filter additive will thereby build up to a thickness of approximately 1 $\mu$m–8 $\mu$m if the transmembrane pressure, i.e. the pressure difference between the feed side or the side of the unfiltered medium and the discharge side or the filtrate side of the membrane, is greater than 0.5 bar, preferably approximately 1-6 bar.

During ultrafiltration, transmembrane pressures greater than 2 bar and preferably 3-8 bar have proven advantageous.

Thus, while in the state of the art it was mostly assumed that in order to avoid clogging of the pores with slurry substances, the transmembrane pressure must not exceed 3 bar for microfiltration or 6 bar for ultrafiltration, the development of cover layers of filter additives or stabilizers according to the invention makes the application of significantly higher transmembrane pressures possible, whereby the filtrate performance can be increased.

In an installation for carrying out a cross-flow filtration process, the procedure according to the invention can be applied with particular efficiency if the membranes have a clear inside diameter of 0.5 mm to 30 mm to receive the unfiltered medium. The flow conditions in cylindrical membranes with such an inside diameter allow a particularly effective development of cover layers of filter additives with simultaneous disturbance and dissolution of slurry layers due to cross flow and turbulence.

Since thin cover layers with a layer thickness of a few μm, consisting of stabilizer or filter additive or at least containing a large proportion of these, can neither penetrate into the membrane pores nor form compact layers over the pores, they can be removed in a relatively simple manner for cleaning of the membrane. This removal, e.g. after completion of a filtration process, can be achieved by rinsing, increase or reversal of the flow rate, or by means of backwash, in that a certain quantity of filtrate is forced back from the filtrate side to the side of the unfiltered medium. When the slurry or the concentrate is removed, the filter additive and/or the stabilizer can be removed simultaneously from the installation.

However, it is advantageous if the stabilizer is retained in the filter system and is e.g. rinsed and regenerated when the membrane is cleaned, i.e. particularly treated with hot lye and subsequently sterilized. In this manner, it is possible to regenerate primarily PVPP as a stabilizer simultaneously with the cleaning of the membrane, which allows economical re-use. Alternatively, it is naturally also possible to remove the retained filter additive into a separate container or into the working tank of the cross-flow filtration installation and to clean and regenerate it there.

BRIEF DESCRIPTION OF THE DRAWINGS

The present invention will be more fully described with reference to the accompanying drawings in which.

DETAILED DESCRIPTION

Figure 1:
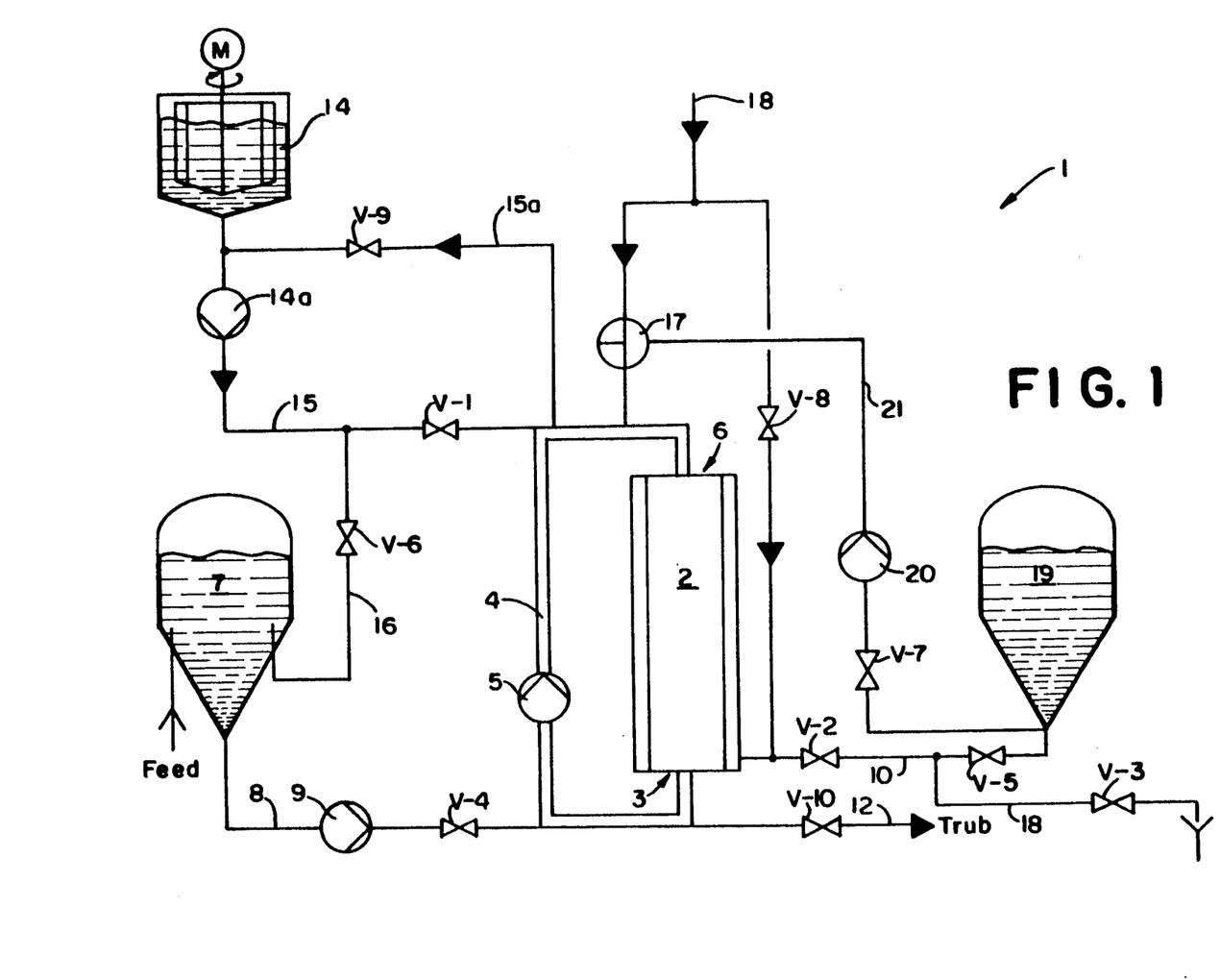
FIG. 1 is a schematic flow diagram of a filtration installation with the characteristics of the invention.

According to FIG. 1, a filtration installation 1 has a cross-flow filter 2, the outlet 3 of which is connected with the filter intake 6 by means of a return line 4 with a pump 5. A medium to be filtered, such as beer, is introduced from a working tank 7 by means of a pump 9 into the return line 4 and the filter 2. The filtrate obtained at the filter 2 is led to the buffer tank 19 through a line 10. The slurry substances collected at the filter exit 2, i.e. specifically yeast, are removed via the line 12. A metering container 14 for introducing PVPP as a stabilizer is connected with the return line 4 via a line 15 with the pump 14a. Naturally it is also possible (depending on the medium) to meter in other stabilizers, such as e.g. diatomite or liquid stabilizers.

The metering container 14 is also connected with the working tank 7 via a line 16.

By means of a selector valve 17, the return line 4 can be connected with a feed line 18, through which water or cleaning liquids, e.g. lye and acid can be introduced into the return line 4 and the filter 2 from feeder devices, which are not shown.

For start-up of a filtration cycle, the selector valve 17 is brought into the position shown, so that fresh water is fed into the return line 4 and the filter 2. In addition, the pump 14a is activated and valve V-1 is opened, so that the stabilizer is metered into the return line 4. By means of the pump 5, the fresh water with added stabilizer is transported through the filter 2. The fresh water penetrates the filter membranes in the filter 2, thereby building up a cover layer of PVPP on the surface of the membrane, as will be described below. The "filtered" water exits line 10 and line 18 with open valves V-2 and V-3 and is removed. As soon as the desired cover layer has been built up in the filter 2, the selector valve 17 is closed. In addition, valve V-1 is closed and valve V-4 opened, and the pump 9 is activated. Thereby, unfiltered medium is transported from the working tank 7 via return line 4 into the filter 2. Filtrate appears at line 10. As soon as the preliminary run of water and filtrate mixed with water has been forced out via line 18, valve V-3 is closed and valve V-5 opened, so that the stabilized and filtrated beer is transported into the buffer tank 19.

The slurry occurring at filter exit 3, i.e. yeast, can be removed via line 12.

In order to add stabilizer to the unfiltered medium as well, valve V-6 is opened, so that the stabilizer is transported directly into the working tank 7. As an alternative, one could also open valve V-1 in order to add stabilizer directly to the return line 4 and the filter 2. Thereby, it is essential that a sufficient quantity of stabilizer is in contact with the unfiltered medium for a sufficient length of time prior to the filtration, so that tanning agents and/or proteins can be bound or precipitated.

Insofar that one or more additional stabilizers or filter additives are to be used, additional metering containers can be provided analogous to the metering container 14 and the corresponding connecting lines to the working tank 7 and/or filter 2. For reasons of clarity, the FIG. 1 shows only one metering container 14 for PVPP.

The start-up of a filtration cycle with water was described above. As can be seen, losses of filtrate occur in the preliminary run. Consequently, the installation can also be started with the filtrate collected in the buffer tank 19. This requires only that the valve V-7 be opened, pump 20 activated, and the selector valve 17 be set in a position, in which the line 21 is connected with the filter intake 6. As is the case for start-up with water, stabilizer and/or filter additive can thereby be metered in from one or more of the metering containers 14 in order to build up a cover layer of stabilizer and/or filter additive on the membrane surface of filter 2. Since the filtrate pumped back from the buffer tank 19 does not contain any slurry substances, the cover layer formed in this manner on the surface of the filter membranes in filter 2 consists exclusively of filter additive and/or stabilizer and is free of slurry substances. Contrary to what is the case for start-up with water, the valve V-5 can remain open during start-up with filtrate, so that the filtration cycle can be continuously initiated by introducing unfiltered medium via pump 9 after pump 20 has been turned off.

When a filtration cycle is to be ended, the filtrate or run-out can be forced out from filter 2 via line 10 e.g. by first adding water via the selector valve 17. Subsequently, the filter 2 can be backwashed with water e.g. by opening valve V-8, and the stabilizer and/or filter additive together with the residue in filter 2 can be removed from the installation via line 12 by opening valve V-10.

However, the cleaning of the installation is achieved in a particularly advantageous manner by introducing a cleaning liquid, e.g. hot lye, through line 18, selector valve 17, and/or valve 8, whereby the PVPP in filter 2 is simultaneously cleaned and regenerated. After cleaning and rinsing, and with addition of fresh water through valve V-8, the PVPP can be transported under pressure from filter 2 through the open valve V-9 and the line 15a into the metering container 14. The cleaning and regeneration of the PVPP can thus be achieved in the installation proper, and regenerated PVPP is available in the metering container 14 for subsequent filtration cycles. In many applications, this may be more economical than the discharge of the stabilizer via line 12 into a separate cleaning and regeneration container (not shown).

Instead of the represented connection between filter outlet 3 and filter intake 6 via the return line 4, the return from filter 2 can naturally also be led to working tank 7. The unfiltered medium is then pumped in a known manner from the working tank 7 through the filter 2 and then returns into the working tank 7. For purposes of cleaning and regenerating the stabilizer the residue (slurry substances mixed with stabilizer) can be returned into the working tank 7 in the same manner to be treated there with known cleaning and regenerating agents, e.g. hot lye, acid, and fresh water. Thereby, the slurry substances are dissolved so that, together with the regeneration liquid, they can subsequently be pressed out through filter 2 as well as line 10 and 18. The stabilizer is retained in filter 2 and can subsequently either be pumped back in the described manner into the metering container 14 or removed via line 12.

Figure 2:
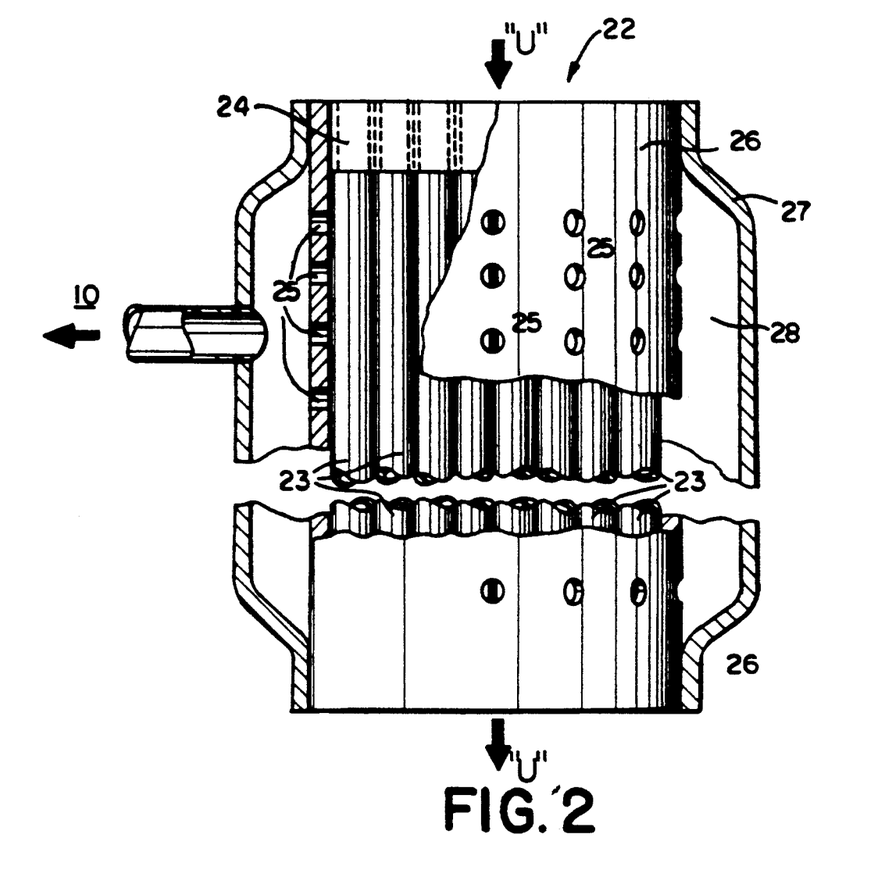
FIG. 2 is a schematic representation of filtration membranes.
Figure 3:
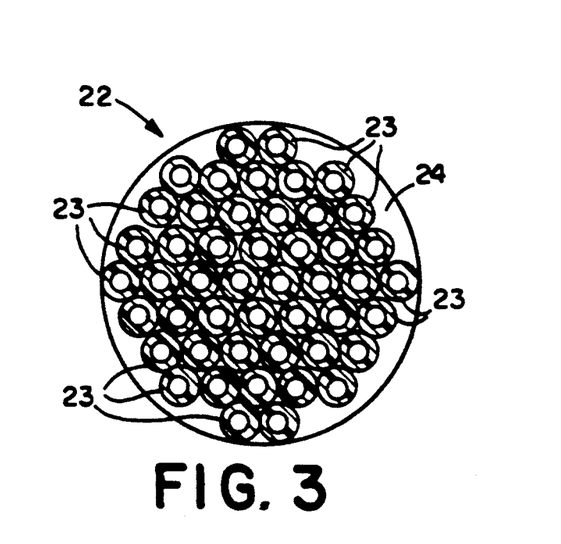
FIG. 3 is a top view of the membrane arrangement according to FIG. 2.

FIGS. 2 and 3 show, schematically, a filter module 22 provided in filter 2, which module has a great number of filter tubes 23. On their insides, the filter tubes 23 are provided with microporous membranes of polysulphone. Other known membranes can also be used, e.g. of polypropylene, ceramics, etc. Such filter modules 22 are known per se and are available e.g. from StorkWafilin, of Gorredjk in the Netherlands. Both ends of the individual filter tubes 23 are encapsulated in end pieces 24 of synthetic material. Naturally, it is also possible to provide an anchoring in rubber seals or other sealing elements. The synthetic end pieces 24 are in sealing contact with a sleeve-pipe 26 which is provided with outlet openings 25. The sleeve pipe 26 is arranged in a header 27, so that the filtrate passing through the membranes of the filter tubes is led through the outlet openings 25 into a circular space 28, limited by the header 27, and from there into the outlet line 10 (FIG. 1). Thereby, the unfiltered medium flows through the filter module 22 in the direction of the arrows "U".

In practical applications, it is naturally possible to arrange a desired number of filter modules 22 in parallel or in series to suit the performance requirements of the filtration installation. For instance, a common header can be provided for a number of filter modules 22, or several headers 27 can be connected in parallel to intake and outlet lines, which then form filter intake 6 and filter outlet 3 according to FIG. 1. In the same manner, the filtrate outlets of several headers 27 can be combined.

The pattern of filter tubes 23 in the end pieces 24 can be recognized from the top view of a filter module 22 as shown in FIG. 3.

Figure 4:
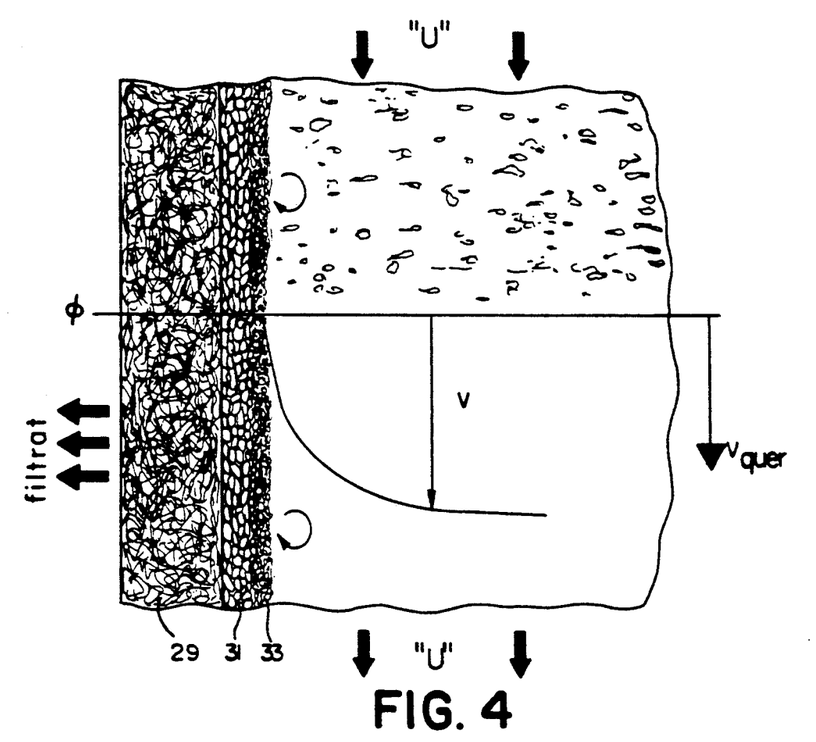
FIGS. 4 and 4a are schematic cross-sections through a filtration membrane with a cover layer of stabilizer.

FIG. 4 shows an execution example in which a layer 31 of PVPP has been applied onto the microporous polysulphone membrane 29 in accordance with the procedure described above. The layer 3 protects the membrane pores from clogging, whereby high through-flow rates can be achieved due to the high porosity of the microfine PVPP layer.

On top of the layer 31, a layer 33 is formed, which consists of slurry substances and PVPP particles embedded in the layer of slurry substance. The PVPP is continuously introduced into the unfiltered medium in the manner described above.

Due to the use of PVPP in the execution example, the known stabilization effect occurs during the filtration of media containing tanning agents, i.e. polyphenoles are bound to the PVPP. In addition, the PVPP in the slurry provides additional protection for the pores of the membrane 29. And, finally, the PVPP particles contained in the unfiltered medium and deposited in the slurry layer 33 cause an effective disturbance of this layer 33: on one hand, the PVPP particles create something like channels in the layer 33, through which unfiltered medium can flow to the membrane 29. On the other hand, extending PVPP particles create eddies which cause a disturbance of the layer 33. This reliably prevents the layer 33 from assuming a closed form which would significantly reduce the filtrate performance.

With use of stabilizers according to the invention, filter performances of such a nature can be achieved that e.g. beer or fruit juice can be filtrated and stabilized in one single step without any pre-filtration in a conventional diatomite filter (e.g. multiple tube filter or layer filter). Naturally, the layer 31 can be obtained also by introducing diatomite, perlite, or other filter additives with the characteristics described above. It is also possible to introduce a mixture of filter additives and stabilizers to the working tank 7 and/or the return line 4 by using several metering containers 14 (or by premixing in one container).

Working with mediums of which the slurry substances do not form too strong cover layer, and by means of dimensioning of the transmembrane pressure in combination with an optimal flow rate for the unfiltered medium, it may be sufficient to disturb and interrupt the layer 33 by means of continuously metered addition of filter additive, without applying a layer 31 (FIG. 4) consisting of only stabilizer and/or filter additive.

Figure 4A:
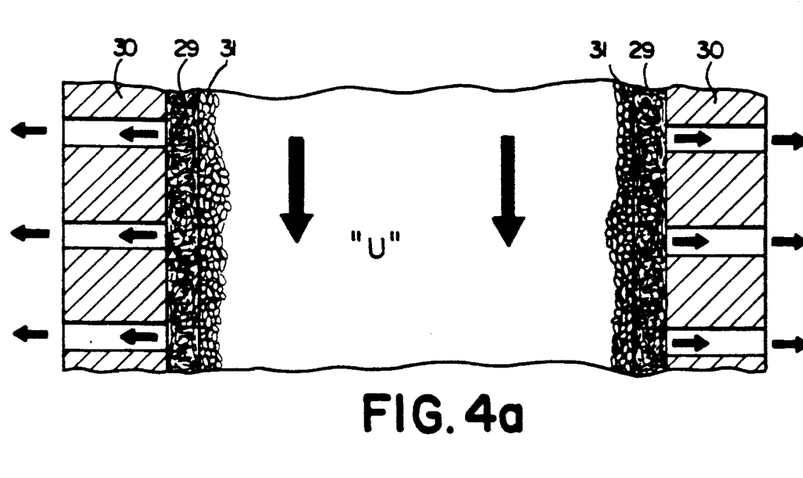

FIG. 4a shows a cross section of a filter tube 23. As represented, a microporous membrane 29 with a maximum pore dimension of 0.5 $\mu$m is attached to the inside wall of a porous carrier tube 30. The unfiltered medium flows through the filter tube 23 in the direction of the arrow "U". Due to the transmembrane pressure, filtrate is thereby pressed through the membrane 29 and subsequently through the carrier tube 30. A cover layer 31 of diatomite is deposited on the membrane 29 and protects the pores of the membrane 29 from clogging by the slurry substances contained in the unfiltered medium. Thereby, the cover layer 31 has a layer thickness of approx. 1–8 μm which presupposes the use of filter additive with corresponding granular distribution. Thereby, it has been found that even with use of filter additives with a specific proportion of particles greater than 10 μm and with the corresponding flow rate no significantly thicker cover layer builds up in the filter tubes 23. The coarser particles of the filter additive apparently are not permanently deposited but serve primarily to disturb layers of slurry substances, as will be explained in the following. (Carrier tube 30, membrane 29, and cover layer 31 are not true to scales in FIGS. 4 and 4a but only schematically represented.)

Figure 5:
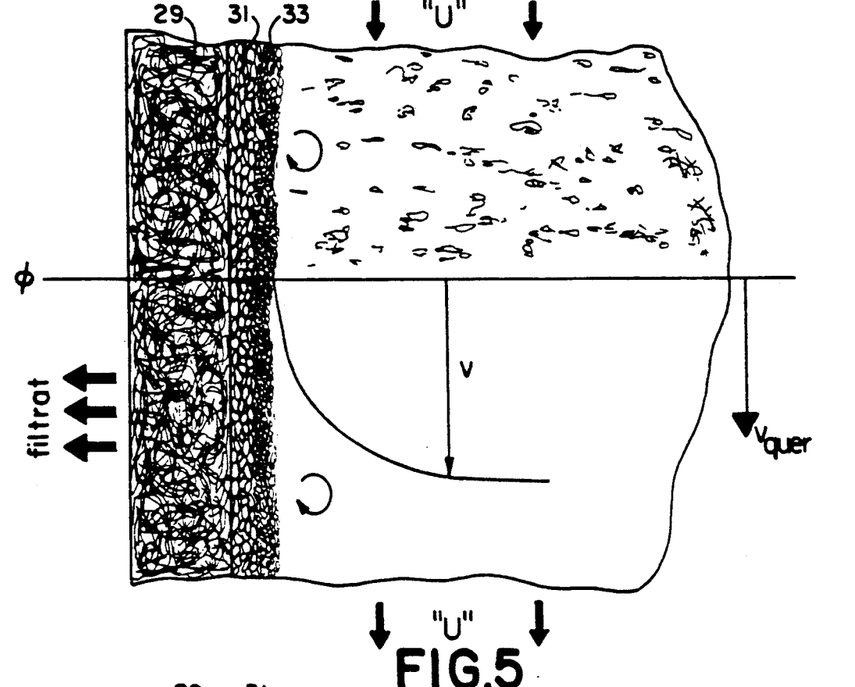
FIGS. 5 through 7 are schematic representations of the build-up of cover layers of filter additives on a membrane surface.

FIG. 5 shows an execution example in which a filter additive cover layer 31 of diatomite has been applied on the membrane 29. Due to the cover layer 31, the membrane pores are protected from clogging, whereby high through-flow rates are achieved due to the high porosity of the microfine cover layer of diatomite.

On the cover layer 31, a layer 33 forms, which consists of slurry substances and of the PVPP particles embedded in the slurry layer. The PVPP is continuously introduced into the unfiltered medium in a known manner.

In the execution example illustrated in FIG. 5, the use of PVPP causes the known stabilization effect during filtration of mediums containing tanning agents, i.e. polyphenoles are bound to the PVPP. In addition, the PVPP in the slurry provides an additional protection for the pores of the membrane 29. And finally, the PVPP particles contained in the unfiltered medium and deposited in the slurry layer 33 cause an effective disturbance of this layer 33: on one hand, the PVPP particles create something like channels in the layer 33 through which the unfiltered medium can flow to the membrane 29. On the other hand, protruding PVPP particles create eddies which cause a disturbance of the layer 33. This reliably prevents the layer 33 from assuming a closed form which would significantly reduce the filtrate performance.

With the use of filter additives according to the invention, filter performances of such a nature can be achieved that e.g. beer or fruit juice can be filtrated in one single step without any pre-filtration in a conventional diatomite filter (e.g. multiple tube filter or layer filter). By adding PVPP it is even possible to simultaneously stabilize mediums containing tanning agents.

Figure 6:
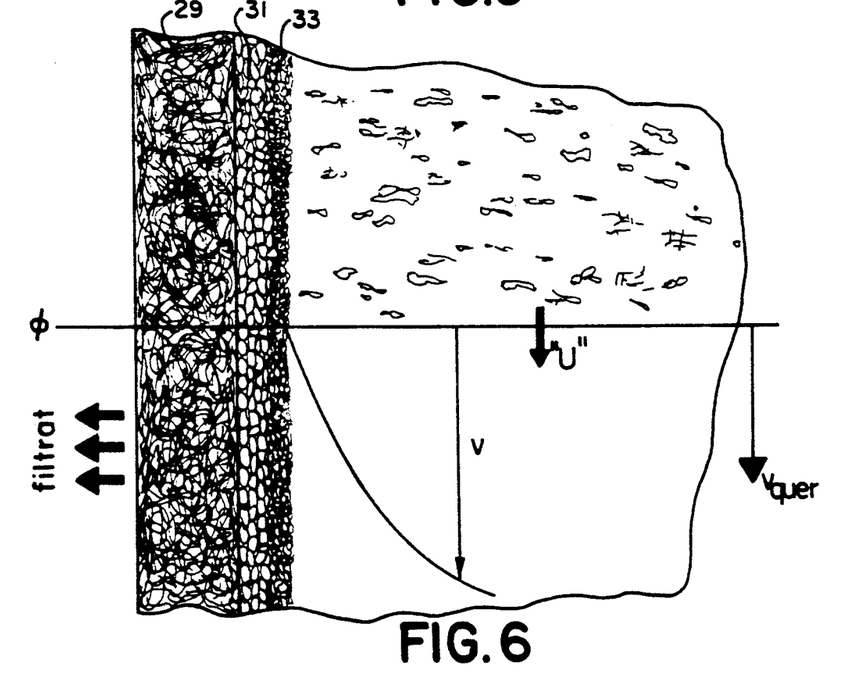

In the execution example according to FIG. 6, a cover layer 31 of perlite is applied on the membrane 29. In certain cases, higher filtrate performance can be achieved in this manner than with diatomite. However, perlite is also suitable for protecting the pores of the membrane 29 from clogging by slurry substances. On the perlite cover layer 31, a layer 33 has been deposited, which consists of slurry substances and perlite particles which disturb the layer 33 and maintain its permeability, analogously with the execution example according to FIG. 5.

Figure 7:
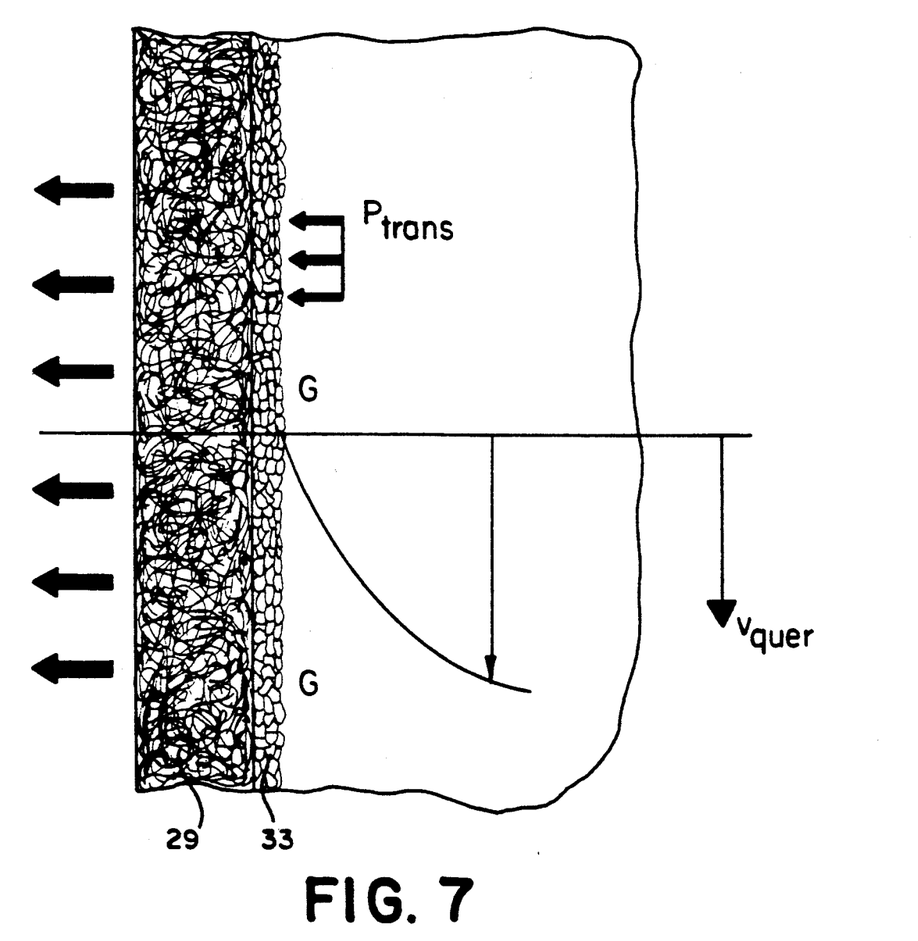

In the execution example according to FIG. 7, the layer 33 of slurry substances and embedded diatomite particles is deposited directly on the membrane 29. The diatomite particles cause the represented formation of channels in the layer 33. In mediums where the slurry substances do not have a too strong tendency to formation of cover layers, and with corresponding dimensioning of the transmembrane pressure $P_{Trans}$ as well as optimal flow rate of the unfiltered material, $V_{Cross}$, it may be sufficient to disturb and disrupt the layer 33 by means of continuously introduced filter additive, without applying a cover layer 31 consisting of only filter additive (FIGS. 5 and 6).

What is claimed is:

1. A single step process for filtering and stabilizing a beverage containing (1) impurities which are removable from the beverage by a filter and containing (2) tanning agents, proteins or both, which are not sufficiently removable by a filter but are by adsorption to a granular stabilizer, comprising:
    (a) pumping the beverage into an inlet of a filter which is of the cross-flow membrane type and has pores in the ultra-filtration or micro-filtration range and which has a closed-circuit arrangement for re-circulating the unfiltered beverage from a circulation-outlet of the filter to the inlet of the filter;
    (b) metering stabilizer into the beverage and circulating the beverage containing stabilizer through the filter and the closed-circuit arrangement thereby binding tanning agents, protein or both to the stabilizer; and
    (c) removing the stabilizer together with any slurry materials retained by the membrane filter.

2. A single step process for filtering and stabilizing a beverage containing (1) impurities which are removable from the beverage by a filter and containing (2) tanning agents, proteins or both, which are not sufficiently removable by a filter but are by adsorption to a granular stabilizer, comprising:
    (a) metering a granular stabilizer into the beverage;
    (b) pumping the beverage into an inlet of a filter which is of the cross-flow membrane type and has pores in the ultra-filtration or micro-filtration range and which as a closed-circuit arrangement for re-circulating the unfiltered beverage from a circulation-outlet of the filter to the inlet of the filter;
    (c) circulating the beverage containing stabilizer through the filter thereby binding tanning agents, protein or both to the stabilizer; and
    (d) removing the stabilizer together with any slurry materials retained by the membrane filter.

3. The process according to claim 1 or 2, in which the beverage is beer.

4. The process according to claim 1 or 2, in which the beverage is wine.

5. The process according to claim 1 or 2, in which the beverage is fruit juice.

6. The process according to claim 1 or 2, in which the stabilizer is PVPP.

7. The process according to claim 1 or 2, further comprising the steps of
    metering a protein precipitation agent into the beverage for binding with protein found therein; and
    removing the bound protein and precipitation agent, together with any slurry materials deposited on the membrane filter at the completion of the filtration cycle.

8. The process according to claim 7, in which the precipitation agent is silica gel.

9. The process according to claims 1 or 2, further comprising the step of providing a filter additive material to the membrane filter for protecting the pores of the filter from clogging.

10. The process according to claim 9, in which the filter additive material is granular.

11. The process according to claim 9, in which the filter additive material is fibrous.

12. The process according to claim 9, in which said providing step further comprises mixing said filter additive material with the unfiltered beverage; and applying said mixture to the filter.

13. The process according to claim 9, in which said providing step further comprises:
mixing said filter additive filter with a medium that has no significant proportion of slurry material; and
applying said mixture to the filter before said beverage is pumped into said filter inlet.

* * * * *